United States Patent [19]

Gosney

[11] 4,271,954
[45] Jun. 9, 1981

[54] BOTTLE ORIENTING APPARATUS

[75] Inventor: Garrison Gosney, Stamford, Conn.

[73] Assignee: New England Machinery, Inc., South Norwalk, Conn.

[21] Appl. No.: 26,563

[22] Filed: Apr. 3, 1979

[51] Int. Cl.³ .................................... B65G 47/24
[52] U.S. Cl. .................................... 198/399; 198/396
[58] Field of Search ............... 198/389, 392, 393, 396, 198/398, 399, 400; 193/45, 47; 221/171, 172, 173

[56] References Cited

U.S. PATENT DOCUMENTS

| 2,752,028 | 6/1956 | Moskowitz et al. | 193/47 X |
| 3,517,797 | 6/1970 | Daleffe et al. | 198/389 |
| 3,624,773 | 11/1971 | Krooss | 198/400 X |
| 3,726,387 | 4/1973 | Krooss | 198/400 |
| 4,148,390 | 4/1979 | Ionescu | 198/399 X |

FOREIGN PATENT DOCUMENTS 1403182 8/1975 United Kingdom .

Primary Examiner—Jeffrey V. Nase
Attorney, Agent, or Firm—Philip Rodman

[57] ABSTRACT

An apparatus for orienting moving bottles in successive fashion from a first random open-end leading disposition to an open-end trailing position and maintaining the orientation of bottles in an open-end trailing disposition includes two pairs of spaced endless movable belts, one of the belt pairs being stepped above the other belt pair in overlapping relationship. In one embodiment of the invention, a pivot member that attachably engages a leading open-end of the bottle and avoids attachable engagement with a leading closed end of the bottle helps distinguish the random dispositions of the bottles. After the bottles have been oriented they are dispensed in successive fashion to an output means for further processing. In another embodiment of the invention the pivot member is replaced by a pair of cam members spaced in the direction of movement of the bottles. A further embodiment of the invention requires only one pair of spaced endless movable belts.

38 Claims, 10 Drawing Figures

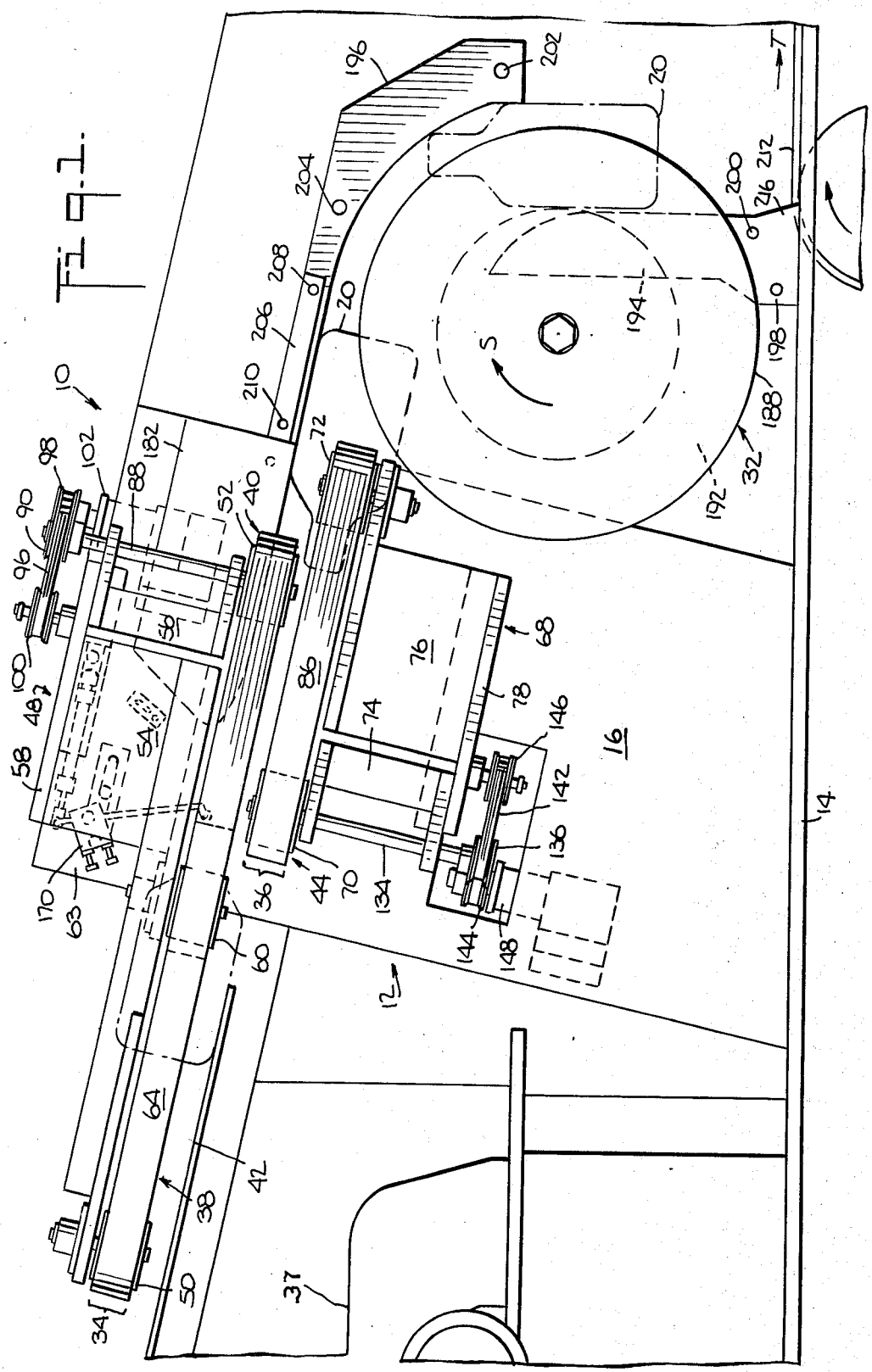

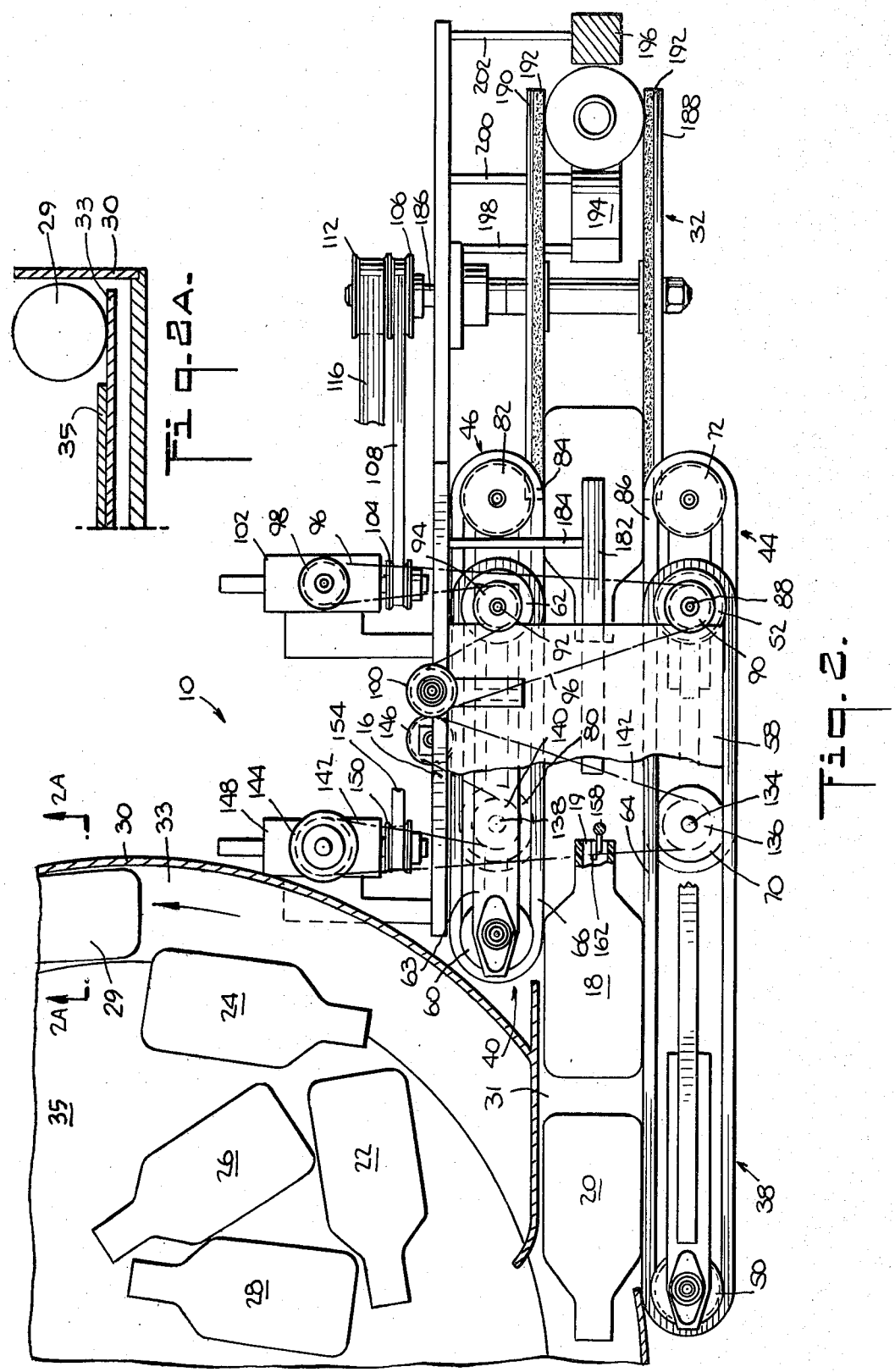

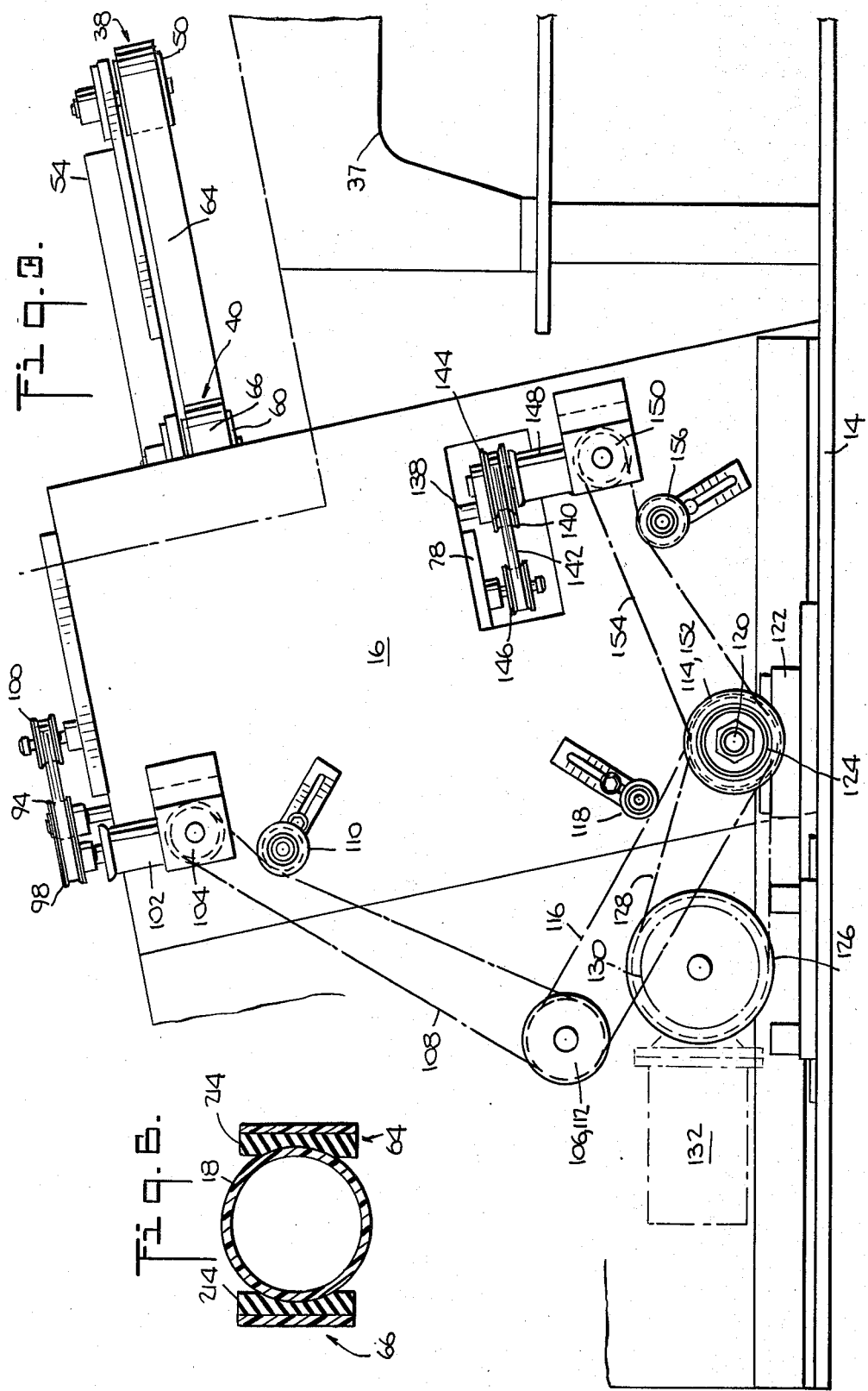

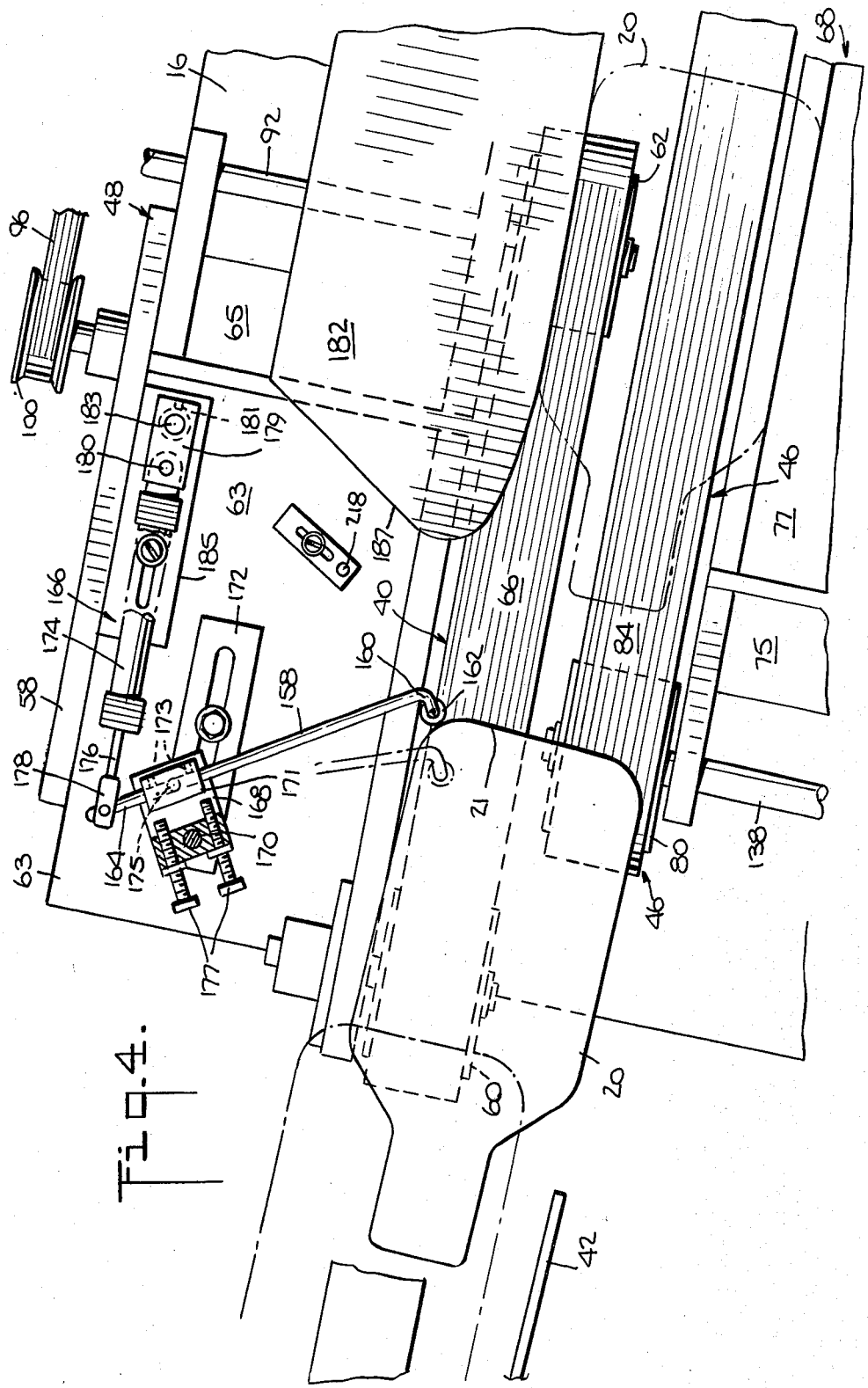

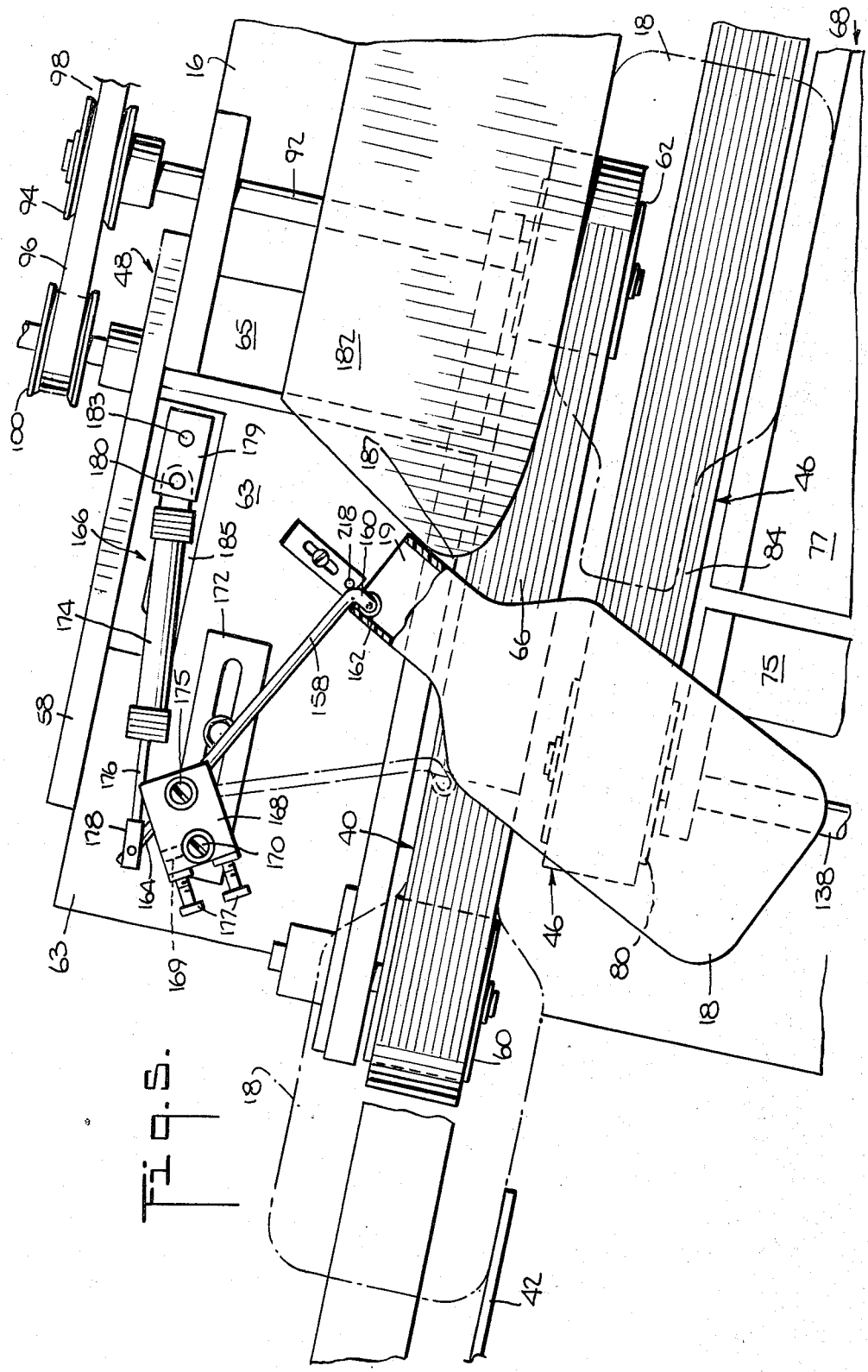

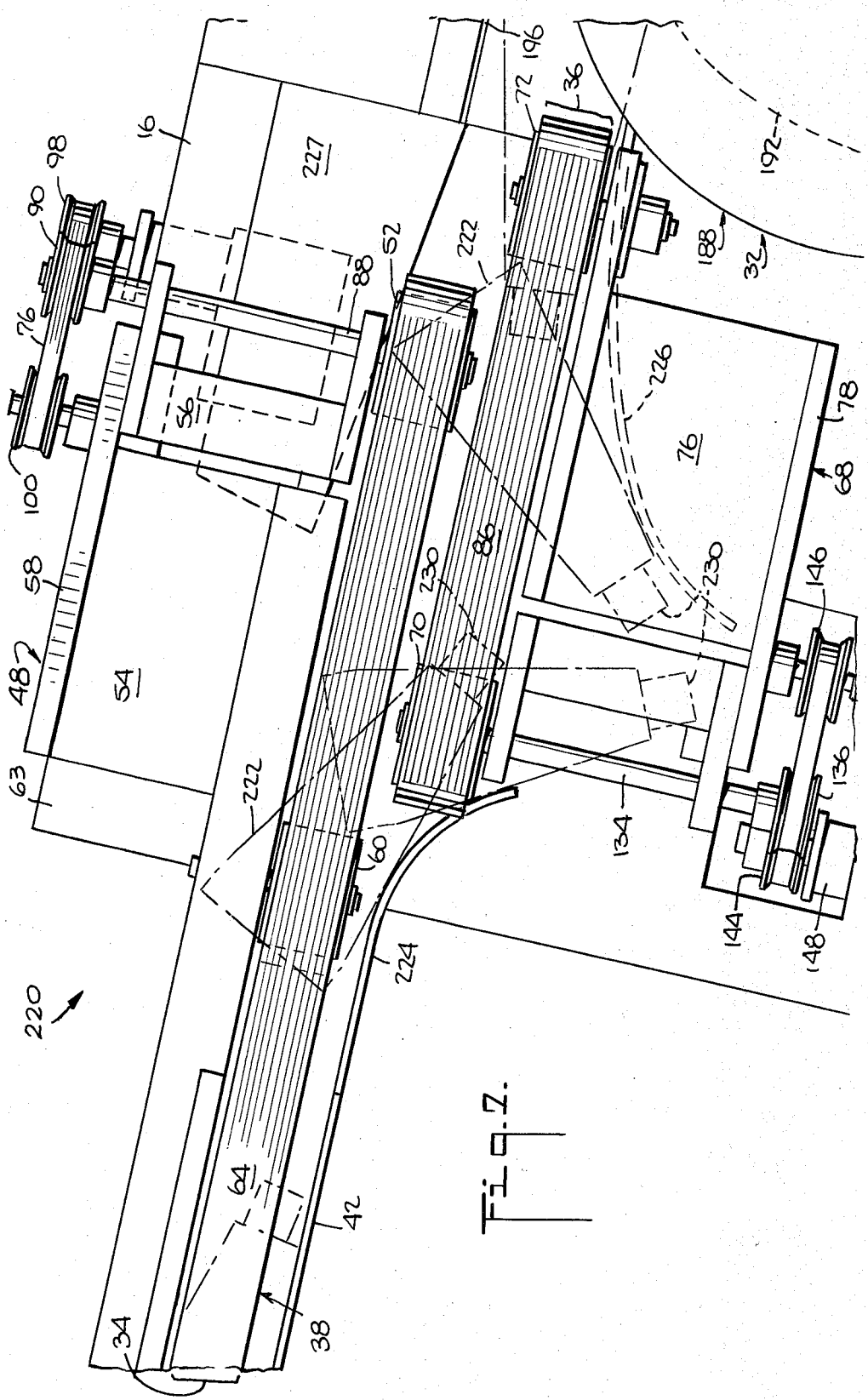

BOTTLE ORIENTING APPARATUS

This invention is directed to new and useful improvements in automated bottle handling equipment, and more particularly, to a novel apparatus for moving unfilled, randomly oriented bottles from one point to another, and positioning said bottles in a predetermined orientation as a result of such movement.

Various operations that are successively performed on empty bottles in automatic fashion, such as cleaning and filling thereof, usually require that the bottles be presented at a processing station in a predetermined position that is compatible with the requirements of the desired operation. Since the automatic cleaning or filling operations, for example, are normally run at predetermined speed rates it is desirable to have the oriented bottles grouped or delivered at corresponding speed rates.

The conventional positioning of bottles from a random orientation to a predetermined orientation is usually accomplished in one or more stages of bottle movement. The time cycle for each stage of movement is normally fixed but can vary due to slippage of the system components, slippage of the bottles with respect to the system components, and slight variances in the operational speed of the system.

Although it is often desirable to move the bottles, in a precisely timed sequence during orientation, to ensure provision of adequate physical spacing between bottles, the slippage and speed variation factors within the system can result in one bottle interfering with the movement of another bottle. Such interference ordinarily interrupts the normal orientation sequence causing a decrease in the expected bottle delivery rate of the system as manifested by one or more missing bottles at a subsequent processing station. Processing efficiency is thus reduced by the number of missing bottles. While bottle interference can be curtailed by slowing down the delivery rate of the system, such slow-downs are economically impractical.

It is thus desirable to provide a bottle orienting apparatus that solves the problem of bottle interference and can maintain high-speed bottle delivery rates.

Among the several objects of the invention may be noted the provision of a novel bottle orienting apparatus, a novel bottle orienting apparatus having a stepped arrangement of endless belts, a novel bottle orienting apparatus that changes the speed of movement of bottles while said bottles are being oriented in a predetermined position, and a novel bottle orienting apparatus that can be easily modified to accommodate bottles of various size and shape such as cylindrical or conical bottles. Other objects and features will be in part apparent and in part pointed out hereinafter.

The present invention relates to a novel bottle orienting apparatus that orients and accelerates the bottles during such orientation.

In one embodiment of the invention, suitable for cylindrical-shaped bottles, the apparatus comprises a first pair of spaced, endless, movable belts, overlapping a second pair of spaced, endless, movable belts stepped below the first pair. Bottle orientation distinguishing means are disposed in alignment with the belt space or bottle movement path of the first pair of endless belts and a bottle delivery means is positioned at the terminal end of the second pair of endless belts. A supply source of randomly oriented, tipped-over bottles, in an open-end trailing disposition or open-end leading disposition is sequentially dispensed into the first pair of endless belts. Movement of the first pair of endless belts draws each bottle away from the supply source at a speed which is higher than the dispensation or supply speed.

Individual bottles, which are in an open-end trailing, base-end leading position do not require any change of orientation. The open-end trailing bottle, while being moved by the first pair of endless belts, is engaged at its leading base end by distinguishing means that comprise a pivoting discriminating hook. The hook, which includes a wheel to prevent any attachment with the base-end of the bottle, does not affect the orientation of bottles in an open-end trailing, base-end leading disposition.

The first pair of endless belts then moves the open-end trailing bottle above the second pair of endless belts. The weight of the bottle as well as its engagement with a cam means causes the bottle to descend to the belt space or bottle movement path of the second pair of spaced, endless belts, with the base-end of the bottle still leading the open-end. The second pair of spaced, endless belts grip the bottle therebetween and move the bottle at a higher speed than the first pair of belts. The bottle is thus accelerated away from the first pair of endless belts towards the delivery means.

This acceleration from one pair of endless belts to another provides a desired physical spacing between successive bottles, thereby minimizing the likelihood of bottle interference during orientation. The cam means also guide the bottle into the delivery means.

Bottles which are in a random open-end leading position at the first pair of endless belts must be oriented to an open-end trailing position to fulfill the positioning requirements, for example, of the next processing station. The leading open-end of the bottle is engaged by and releasably attached to the discriminating hook. The combination of hook attachment and belt movement elevates the leading open-end of the bottle toward a stop member that limits forward movement of the bottle at its open-end, temporarily fixing the position of the open end. The main body portion of the bottle, which is still gripped between the endless belts, continues to move, pivoting around the elevated and temporarily fixed open end of the bottle to place the base end of the bottle in a leading position. During this bottle pivoting, the base end of the bottle projects below the first pair of endless belts for engagement by the faster moving second pair of endless belts. The second pair of endless belts is arranged to maintain a greater gripping force than the first pair of endless belts and thus pulls the bottle away from the first pair of endless belts in its base-end leading position. The bottle is then drawn toward and guided into the delivery means by the second pair of endless belts and the cam means.

In another embodiment of the invention, suitable for conical shaped bottles, the apparatus is as previously described except that the bottle orientation distinguishing means does not include a discriminating hook but comprises first and second cam members spaced from each other in the direction of bottle movement.

Conical bottles in base-end forward, open-end trailing disposition do not require any change of orientation. For example, an open-end trailing bottle is moved by the first pair of endless belts over the first cam member to the cam space between the first and second cam members. The base-end of the bottle is momentarily held by the first pair of endless belts while the open-end of the bottle pivots downwardly into the cam space. The base-end of the bottle then descends to the second pair of spaced endless belts which grip and hold the base-end of the bottle. The second pair of belts move the bottle in base-end forward disposition over the second cam toward the delivery means. A cam means similar to that of the first embodiment guides the bottle into the delivery means.

Bottles which are in a random open-end leading disposition at the first pair of endless belts must have their orientation reversed. For example, the leading open-end of the bottle is moved over the first cam member into the cam space while the base-end of the bottle is momentarily gripped by the first pair of belts. The base end of the bottle descends to the second pair of endless belts which grip the base-end, moving it to a forward position while the second cam member cams the open-end of the bottle into a trailing position. The second pair of endless belts then moves the bottle, base-end forward, toward the delivery means, guided by the cam means.

The first and second cam members thus cooperate with the first and second belt pairs to change the position of the conical bottles from an open-end leading disposition to an open-end trailing disposition, but do not change the orientation of bottles that are already in an open-end trailing disposition.

A further embodiment of the invention differs from the previously described embodiment by elimination of one of the pairs of endless belts and provision of the first and second cam members at the same level with respect to the remaining pair of endless belts.

The invention accordingly comprises the constructions hereinafter described, the scope of the invention being indicated in the following claims.

In the accompanying drawings, in which various possible embodiments of the invention are illustrated, FIG. 1 is a front elevational view of a bottle orienting apparatus incorporating one embodiment of the present invention;

FIG. 2 is a plan view thereof;

FIG. 2a is a sectional view taken on the line 2A—2A of FIG. 2;

FIG. 3 is a rear elevational view of the apparatus;

FIGS. 4 and 5 are enlarged fragmentary views of a bottle distinguishing means included in the apparatus;

FIG. 6 is a sectional view showing a bottle disposed between a pair of endless belts; and FIGS. 7-9 show further embodiments of the present invention.

Corresponding reference characters indicate corresponding parts throughout the several views of the drawings.

Figure 8:
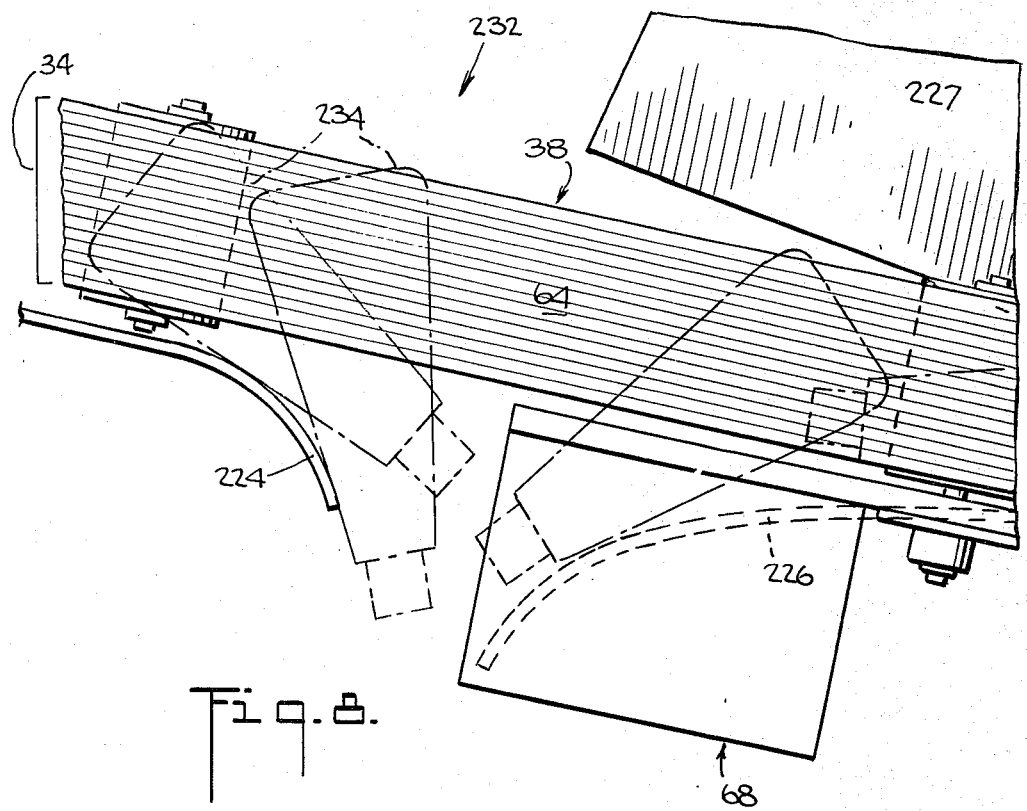

Referring to the drawings, especially FIGS. 1 and 2, a bottle orienting apparatus incorporating one embodiment of the invention is generally indicated by reference number 10.

The apparatus 10 comprises a frame 12 mounted or anchored to a floor in any suitable known manner. The frame 12 includes a base member 14 and an upright support member 16 extending from the base member 14.

Transport means for receiving and moving bottles such as 18, 20, 24, 26, 28 and 29 (FIG. 2) from a supply bowl 30 to a discharge wheel 32 comprise endless belt pairs 34 and 36. The belt pair 36 is stepped below and overlapped by the belt pair 34. Preferably the supply bowl 30 and the belt pairs 34 and 36 are inclined at an angle of approximately 20°.

The supply bowl 30 includes a disc 33 stepped below and secured to a disc 35 for rotation together. The bottles 22-29 in the bowl 30 normally tip over during rotation of the discs 33 and 35, and move toward the bowl periphery for dispensation through a bowl dispensation opening 31. Any suitable known means for supporting the bowl 30 and rotating the discs 33 and 35 is schematically indicated at reference number 37.

The belt pair 34 comprises a relatively long endless belt assembly 38 confrontingly spaced from a relatively short endless belt assembly 40 to define a bottle movement path or belt space. A nonmovable support 42 provided below the endless belt assemblies 38 and 40 extends from the supply bowl 30 to a termination point in advance of the belt pair 36.

The belt pair 36 comprises endless belt assemblies 44 and 46 of substantially equivalent extent and confrontingly spaced from each other to define another bottle movement path or belt space.

The endless belt assemblies 38 and 40 are suspended from the frame 12 by means of a belt support structure generally indicated by reference number 48. The belt assembly 38 (FIG. 1) is supported at respective pulleys 50 and 52 by brackets 54 and 56 of the support structure 48. The brackets 54 and 56 depend from a main plate 58 cantilevered to the upright support member 16.

The shorter endless belt assembly 40 (FIGS. 4 and 5) is supported at respective pulleys 60 and 62 by brackets 63 and 65 that depend from the main plate 58. The support brackets 54-56 and 63-65 for each of the endless belt assemblies 38 and 40 are spaced from each other by a distance that exceeds the spacing between confronting belts 64 and 66 that pass around respective pulley pairs 50-52 and 60-62 of the endless belt assemblies 38 and 40.

The endless belt assemblies 44 and 46 are supported on the frame 12 by means of a belt support structure generally indicated by reference number 68. The belt assembly 44 (FIG. 1) is carried at pulleys 70 and 72 by brackets 74 and 76 of the support structure 68. The brackets 74 and 76 are mounted to a main plate 78 cantilevered to the upright support member 16.

The endless belt assembly 46 (FIGS. 4 and 5) is supported at respective pulleys 80 and 82 (not shown) by brackets 75 and 77, similar to the brackets 74 and 76, and are likewise mounted on the main plate 78 (FIG. 1). The support brackets 74-76 and 75-77 for each of the endless belt assemblies 44 and 46 are spaced from each other by a distance that exceeds the spacing between the confronting belts 84 and 86 that pass around respective pulley pairs 70-72 and 80-82 of the endless belt assemblies 44 and 46.

The pulley 52 of the endless belt assembly 38 is connected to one end of a shaft 88 (FIG. 1) that extends through the bracket 56 of the belt support structure 48. The opposite end of the shaft 88 is affixed to a pulley 90. The pulley 62 of the endless belt assembly 40 is connected to one end of a shaft 92 (FIG. 5) that extends through the bracket 65 of the belt support structure 48. The opposite end of the shaft 92 is fixed to a pulley 94. The pulleys 90 and 94 are driven by a drive belt 96 which also passes around an output drive pulley 98 and an idler pulley 100 (FIG. 2).

Referring to FIG. 3 the output drive pulley 98 is connected through a right angle drive 102 to an input drive gear 104 that communicates with a gear 106 through a gear belt 108. The tension of the gear belt 108 is maintained by an adjustable idler 110. A gear 112 tandemly fixed to the gear 106 communicates with a gear 114 through a gear belt 116. The tension of the gear belt 116 is maintained by an adjustable idler 118.

The gear 114 is fixed to one end of a shaft 120 rotatably mounted on a support plate 122. A sprocket 124 affixed to the opposite end of the shaft 120 communicates with a sprocket 126 through a chain 128. The sprocket 126 constitutes the output side of a speed reducer 130 powered by a motor 132.

Referring to FIGS. 1 and 2, the pulley 70 of the endless belt assembly 44 is connected to a shaft 134 that extends through the bracket 74 of the belt support structure 68. The opposite end of the shaft 134 is fixed to a pulley 136. The pulley 80 (FIGS. 4 and 5) of the endless belt assembly 46 is connected to a shaft 138 that extends through a bracket 75 of the belt support structure 68. The opposite end portion of the shaft 138 is fixed to a pulley 140 (FIG. 3). As seen in FIG. 2 the pulleys 136 and 140 are driven by a drive belt 142 which also passes around an output drive pulley 144 and an idler pulley 146.

Referring to FIG. 3 the output drive pulley 144 is connected through a right angle drive 148 to an input drive gear 150 that communicates with a gear 152, tandemly fixed to the gear 114, through a gear belt 154. The tension of the gear belt 154 is maintained by an adjustable idler 156.

Means for distinguishing between a bottle in open-end leading disposition or closed-end leading disposition, most clearly shown in FIGS. 4 and 5, comprise a pivot rod 158. The rod 158 has a hooked end portion 160 having a wheel 162 and a straight end portion 164 joined to a biasing means 166 similar to that disclosed in application Ser. No. 871,940 filed Jan. 24, 1978 and assigned to the present assignee.

Referring to FIG. 4 the rod 158 is housed in a clevis 168 that is locked by setscrews 169 (FIG. 5) onto a pin 170 extending from an adjustable support mount 172. The support mount 172 is bolted to the bracket 63. A sleeve 171 is locked to the rod 158 by setscrews 173 and pivots with respect to the clevis 168 on a pair of pivot pins 175 located in opposite ears of the clevis. The pivot pins 175 engage the sleeve 171 from opposite directions but do not pass through the sleeve 171 or the rod 158. The clevis 168 also includes a pair of adjusting screws 177 that limit pivotal movement of the sleeve 171.

Referring to FIG. 4 the biasing means 166 comprise a suitable known pneumatic or hydraulic cylinder 174 having a piston rod 176 coupled to the straight end 164 of the rod 158 with a coupling 178. The cylinder 174 is pivoted to a clevis 179 at 180. The clevis 179 is locked by a setscrew 181 onto a pin 183 extending from an adjustable support mount 185 bolted to the bracket 63.

The bottle orientation distinguishing means further comprise a cam member 182 positioned in alignment with the bottle movement path or belt space of the endless belt pair 34. The cam member 182 is secured to the upright support member 16 by attachment posts such as 184.

The discharge wheel 32 is rotatable on a shaft 186 that is supported on the upright support member 16 and driven by the gear 112. The discharge wheel 32, which rotates in the direction S (FIG. 1), includes a pair of spaced discs 188 and 190, each of which is provided with an annular resilient pad 192. A pair of cam members 194 and 196 disposed between the discs 188 and 190 are secured to the upright support member 16 by attachment posts 198, 200, and 202, 204 respectively. A plate 206 (FIG. 1) joins the cam 182 to the cam 196 and can be secured to the upright support member 16 by attachment posts 208, 210.

A conveyor belt 212 is disposed at the base member 14 intermediate the discs 188 and 190 for movement in the direction T.

In using the apparatus 10, bottles such as 18 through 29 are dispensed in a tipped-over position from the opening 31 in the supply bowl 30 to the belt space between the endless belt assemblies 38 and 40. The dispensation speed of the bottles from the supply bowl opening 31 can be, for example, 3,000 inches per minute. The bottles are received in the belt space in an open-end leading disposition or an open-end trailing disposition, the orientation being entirely random. The speed at which the belts 64 and 66 move is set to exceed the speed at which the bottles are dispensed from the bowl opening 31 such as for example 3,500 inches per minute. Thus, the bottles are accelerated by the belts 64 and 66 away from the bowl 30.

The belt space distance is slightly less than the cross-sectional dimension of the bottle 18 as indicated in FIG. 6. The bottle is thus compressed a predetermined amount between the belts 64 and 66. As each belt includes a resilient liner 214, there is a gripping action between the belts 64 and 66 sufficient to hold and move the bottle yet slight enough to permit the weight of the bottle, when unsupported, to overcome the gripping force.

Bottles that are dispensed by the bowl 30 to the belt pair 34 in an open-end trailing disposition do not require any change of orientation. For example, the bottle 20 in FIG. 2 will ride on the support surface 42 while being moved by the belts 64 and 66. The support surface 42 terminates a predetermined distance before the endless belt pair 36, which distance is set in accordance with the size and speed of movement of the bottle 20. As seen in FIG. 4, a closed end 21 of the bottle 20, being moved by the belt 66 (belt 64 not shown) engages the wheel 162 of the pivot rod 158, the bottle movement and orientation not being affected by such engagement.

After the bottle 20 moves beyond the support surface 42 it begins to drop in controlled fashion due to the predetermined grip between the belts 64 and 66 and enters the belt space between the belts 84 and 86 of the belt pair 36 with closed end 21 still leading the open end. The speed of movement of the belts 84 and 86 is predetermined to exceed the speed of the belts 64 and 66 by a factor of about 2½ to 3, such as for example, 9,000 inches per minute. The grip exerted on the bottle 20 by the belts 84 and 86 is set to exceed that of the belts 64 and 66. The bottle 20 is thus accelerated with respect to its movement by the belt pair 34 and the grip of the belts 84 and 86 is predetermined to ensure that the bottle 20 will not drop free of the belts 84 and 86 while being moved by said belts.

The bottle 20 then passes below the cam 182 which guides the bottle along a predetermined centerline for entry into the discharge wheel 32. The wheel discs 188 and 190 move the bottle 20 in an arc defined between the cams 194 and 196 at a speed which equals or exceeds that of the belts 84 and 86. The annular resilient pads 192 on each wheel disc 188, 190 grip the bottle 20 sufficiently to move it, yet permit its release on the conveyor belt 212 in an upright position when the bottle 20 reaches a base incline 216 (FIG. 1) of the cam 194. The conveyor belt 212 moves the bottle 20 to a processing station (not shown) for further bottle treatment such as filling or cleaning.

Bottles that are dispensed by the bowl 30 to the belt pair 34 in an open-end leading disposition require a change of orientation. For example, the bottle 18 in FIG. 2 has a leading open-end 19 that is engaged by the wheel 162 of the pivot rod 158 while being moved by the belts 64 and 66.

As seen in FIG. 5, the open end 19 of the bottle 18 is pivoted upwardly toward an adjustable stop pin 218 that limits further pivotal movement of the rod 158. While the open end 19 of the bottle 18 is lifted towards the stop pin 218 during engagement with the wheel 162 of the rod 158, the closed end of the bottle 18 descends in controlled fashion toward the belt assembly 46. It should be noted that the bottle 18 is continuously being moved by the belt pairs 34 or 36 while the open-end 19 is engaged by the rod 158. Since the open-end 19 of the bottle 18 is, in a sense, trapped by the rod 158 against the stop pin 218, the belt pairs 34 or 36 essentially pivot the bottle about the stop pin 218 such that the closed end of the bottle 18 begins to lead the open-end.

It will be noted that a nose portion 187 of the cam 182 is located a predetermined distance from the stop pin 218 to help stabilize the rotational movement of the bottle 18 about the stop pin 218. As will be apparent from FIG. 5, the closed end of the bottle 18 begins to lead the open-end 19 through counterclockwise pivoting of the closed end about the wheel 162. The open end 19 will then drop away from the wheel 162 and the hooked end 160 of the pivot rod 158. Movement of the bottle 18 at this juncture is controlled solely by the belt pair 36. The bottle 18, with its closed end leading the open-end 19 enters or is dispensed into the discharge wheel 32 for movement to the conveyor belt 212 in an upright position in the manner previously described for the bottle 20.

Another embodiment of my invention is generally indicated by reference number 220 in FIG. 7. This embodiment is suitable for orientation of bottles 222 having a conical shape and eliminates the pivot rod 158 with its associated biasing structure. The eliminated structure is replaced by means for distinguishing a bottle in open-end leading disposition or closed-end leading disposition that comprises two cam members 224 and 226 respectively disposed below the belt pairs 34 and 36. A cam 227 is substituted for the cam 182.

The cam 224, while shown as a continuation of the support surface 42, can be formed as a separate structure. The cam 226 is aligned with the belt space or bottle movement path of the belt pair 36.

In using the apparatus 220, bottles 222 of conical shape are dispensed in a tipped-over position from a bottle supply source such as the supply bowl 30, in an open-end leading disposition or an open-end trailing disposition, determined at random. As previously described for the cylindrical bottles 18 and 20, the bottle 222 is pressed a predetermined amount between the belts 64 and 66 during movement by said belts. However, due to its conical shape the bottle 222 is gripped mainly at its maximum cross-sectional area near a base portion 228.

The bottle 222, as shown in FIG. 7, requires a change of orientation from an open-end leading disposition to a closed-end leading disposition. As the bottle 222 is moved along the surface of the cam 224 by the belt pair 34, its open-end 230 descends into the cam space between the cams 224 and 226 while the base-end 228 continues to move with the belt 64. The base end 228 of the bottle 222 also descends in a controlled fashion toward the belt pair 36 as its weight overcomes the predetermined grip exerted by the belt pair 34.

The base 228 of the bottle 222 when gripped by the belt pair 36 is held with a holding force greater than that of the belt pair 34. The belt pair 36 thus controls movement of the bottle 222 toward the discharge wheel 32 and draws the base end 228 into a leading position on the surface of the cam 226 with the open end 230 lagging in trailing disposition. In this manner the bottle is oriented in a closed-end leading disposition (FIG. 7), and dispensed into the discharge wheel 32 for movement onto the conveyor belt 212 (FIG. 1) as previously described for the bottle 20. The cam 227 guides the bottle 222 along a predetermined centerline for entry into the discharge wheel 32. Since the bottle 222 does not engage the nose portion of the cam 227, a curved nose portion such as 187 (FIG. 5) need not be provided.

Although not shown in FIG. 7, bottles 222 in a closed-end leading disposition undergo no net change of orientation while being moved from the supply bowl 30 to the discharge wheel 32. For example, a bottle of conical shape in closed-end leading disposition, will be held at its base end by the belt pair 34 for a long enough time to permit the open-end 230 to assume a downward position in the cam space between the cams 224 and 226. Although the grip exerted by the belt pair 34 is predetermined to permit descent of the base end 228 of an unsupported bottle, such descent follows the descent of the open end 230 into cam space between the cams 224 and 226. Thereafter the base end 228 of the bottle, no longer supported by the straight portion of the cam 224, will descend from the belt pair 34 to the belt pair 36 in controlled fashion as previously described.

The belt pair 36 will continue to move the bottle 222 toward the discharge wheel 32 in a base-end leading disposition while the open-end lags behind as it rides the surface of the cam 226 in trailing disposition. The bottle 222 is then dispensed into the discharge wheel 32 by the belt pair 36 for movement onto the conveyor belt 212 (FIG. 1) in a manner previously described for the bottle 20. The cam 227 guides the bottle 222 along a predetermined centerline for entry into the discharge wheel 32.

Where a very high rate of bottle movement is required the bottle orienting system can incorporate a timing wheel (not shown) such as disclosed in U.S. Pat. No. 4,095,688 assigned to the present assignee. The timing wheel is used to control any erratic dispensation of bottles when the supply bowl 30 is operated at a very high speed rate. The timing wheels reduce the bowl speed dispensation to a predetermined desired rate. Movement of the bottles past the timing wheels to the belt pair 34 and the discharge wheel 32 takes place as previously described.

When a considerably low rate of bottle movement is desired from the supply bowl 30 to the discharge wheel 32, another embodiment of my invention generally indicated by reference number 232 as shown in FIG. 8 can be used. The apparatus 232 is essentially the apparatus 220 with the belt pair 36 removed and both of the cams 224 and 226 disposed at the same level with respect to the belt pair 34. As seen in FIG. 8, the cams 224 and 226 orient the conical bottles 234 in cooperation with the belt pair 34 in a manner similar to that previously described. However, the belt pair 34 is arranged to grip the bottles 234 with sufficient force to prevent them from dropping free of the belts during movement over the space between the cams 224 and 226. The belt pair 34 then dispenses the bottles 234 into the discharge wheel 32 (not shown) in a manner similar to that previously described.

Figure 9:
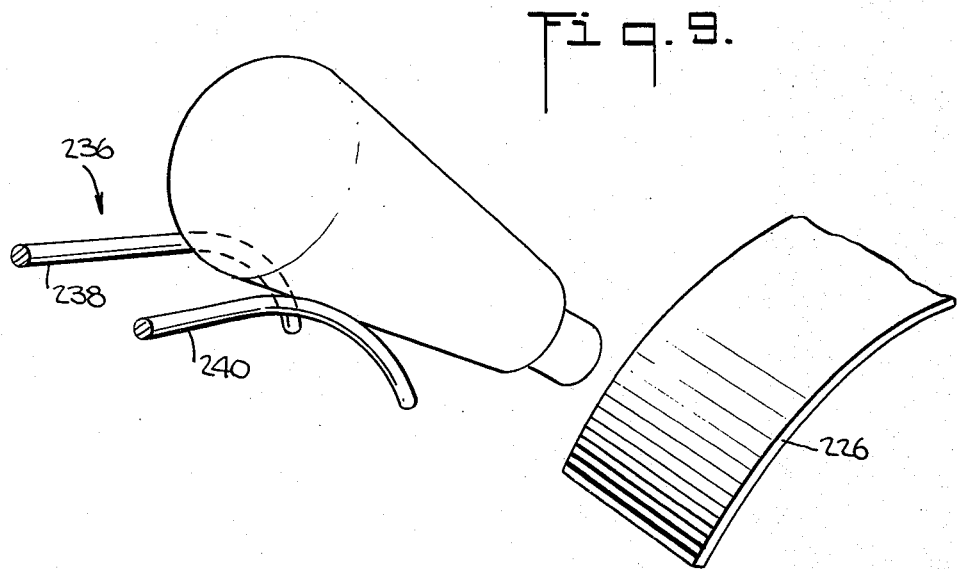

If desired, a cam 236 (FIG. 9) comprising spaced curved bars 238 and 240, can be substituted for the cam 224.

As will be apparent to those skilled in the art the spacing, arrangement and inclination of the supply bowl 30, the endless belt assemblies 34 and 36 and the cam members 182, 224, and 226 can be made adjustable in accordance with known skills in the art to permit appropriate modification of the apparatus according to the sizes and shapes of various bottles requiring orientation.

The different size belt assemblies 38 and 40 of the belt pair 34 is based on the dispensation arrangement with the supply bowl 30. Although the bottle supply source disclosed herein is the supply bowl 30, other suitable known means for dispensing bottles to the belt pair 34 can be used, and depending upon the dispensing means selected the belt pair 34 can comprise individual belt assemblies of equal length.

It will be further apparent that the embodiment of FIG. 7 can be used to orient bottles of conical shape that have been filled and capped since the cam means for distinguishing between the first and second random dispositions of the bottles does not rely on the open or closed condition of the bottle.

Whereas the cam members 182, 194, 196, 224, and 226 have been secured to the frame 12 by attachment posts it is also possible to fasten these members to other portions of the frame such as the base 14, and/or the pulley support structures 48 and 68.

Some advantages of the present invention evident from the foregoing description include a bottle orienting apparatus that, in the preferred embodiments, accelerates the bottles, during their orientation. Because the bottles are accelerated as they pass from one belt path to another sufficient physical spacing between successive bottles will result to avoid the problem of bottle interference during bottle orientation. The present system can thus improve the overall efficiency of a bottling system by minimizing the number of missing bottles at a processing station sequentially following the bottle orienting apparatus. A further advantage is that the apparatus can be easily modified to accomodate bottles of various size and shape.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for moving unfilled open bottles in a first general direction and orienting said moving bottles from a first random open-end leading disposition with respect to said first direction, to an open-end trailing position with respect to said first direction and maintaining the orientation of unfilled moving bottles in a second random open-end trailing disposition with respect to said first direction comprising,
   (a) means for initially dispensing said bottles in sequential order at a first predetermined rate of speed, in a tipped over position, in said first random open-end trailing disposition or said second random open-end leading disposition,
   (b) first transport means for receiving and moving said initially dispensed bottles in said first and second random dispositions at a second predetermined rate of speed, said first transport means comprising a first pair of spaced endless movable belts confrontingly spaced apart a first predetermined distance,
   (c) second transport means for receiving each of said bottles from said first transport means and moving each of said bottles at a third predetermined rate of speed for further dispensation thereof, said second transport means comprising a second pair of spaced endless movable belts confrontingly spaced apart a second predetermined distance, said second pair of spaced endless belts being stepped below said first pair of spaced endless belts, and
   (d) means for distinguishing between said first and second random dispositions while said bottles are moving from said first transport means to said second transport means, said distinguishing means including means for maintaining the second random disposition of said bottles and converting said first random disposition of said bottles to open-end trailing position such that all bottles dispensed by said second transport means are in said open-end trailing disposition.

2. An apparatus as claimed in claim 1, wherein said bottles have a maximum crosswise dimension in a plane perpendicular to said first direction, said second pair of spaced endless movable belts being spaced apart a distance less than said maximum crosswise dimension of said bottles.

3. An apparatus as claimed in claim 1, wherein said first and second pairs of spaced endless movable belts include a facing of resilient material for engaging said bottles and maintaining a predetermined grip on each of said bottles disposed between said belts.

4. An apparatus as claimed in claim 1, wherein said second pair of spaced endless belts are of substantially equivalent extent in said first direction.

5. An apparatus as claimed in claim 1 wherein said distinguishing means comprise a cam member disposed in a predetermined position with respect to said first and second pairs of endless belts for engagement with each of said first and second randomly disposed bottles at said first and second pairs of endless belts.

6. An apparatus as claimed in claim 1, wherein said first pair of spaced endless belts are of unequal extent in said first direction.

7. An apparatus as claimed in claim 7, wherein said second pair of spaced endless belts is overlapped a predetermined amount by said first pair of spaced endless belts.

8. An apparatus as claimed in claim 1, wherein said second predetermined distance is less than said first predetermined distance to enable said second pair of spaced endless belts to maintain a tighter grip on said bottles than said first pair of endless belts.

9. An apparatus as claimed in claim 8, wherein the predetermined distance between said first pair of spaced endless belts is selected to permit downward movement toward said second pair of spaced endless belts at the overlap portion of said belts of one of said bottles being moved in said first direction by said first pair of endless belts.

10. An apparatus as claimed in claim 9, wherein the stepped distance between said first and second pairs of endless belts is predetermined to enable said second pair of endless belts to grip one of said bottles while said one bottle disengages from said first pair of endless belts.

11. An apparatus as claimed in claim 10, wherein said third predetermined speed rate exceeds said second predetermined speed rate to enable said second pair of belts to pull said one bottle away from first pair of endless belts while said bottle is commonly engaged by said first and second pairs of endless belts.

12. An apparatus as claimed in claim 10, wherein said first and second pairs of endless belts each have opposite entry and terminal portions the entry portion of said second pair of endless belts being intermediate the entry and terminal portions of said first pair of endless belts with reference to said first direction.

13. An apparatus as claimed in claim 9, wherein said third predetermined speed rate exceeds said second predetermined speed rate to enable said second pair of endless belts to accelerate said one bottle with respect to said first pair of endless belts.

14. An apparatus as claimed in claim 1, wherein said second pair of spaced endless belts is substantially parallel with said first pair of spaced endless belts.

15. An apparatus as claimed in claim 1, wherein said first pair of spaced endless belts define therebetween a first linear path of movement and said second pair of spaced endless belts define a second linear path of movement, said first and second linear paths having center lines that are substantially coplanar.

16. An apparatus as claimed in claim 1, wherein said first and second pairs of endless belts each have opposite entry portions and terminal portions, the entry portion of said second pair of endless belts being intermediate the entry and terminal portions of said first pair of endless belts with reference to said first direction.

17. An apparatus as claimed in claim 1, wherein said first and second pairs of endless belts each have opposite entry and terminal portions, the terminal portion of said second pair of endless belts extending beyond the terminal portion of said first pair of endless belts with reference to said first direction.

18. An apparatus as claimed in claim 1, wherein said second predetermined speed rate exceeds said first predetermined speed rate and said third predetermined speed rate exceeds said second predetermined speed rate.

19. An apparatus as claimed in claim 18, wherein said third predetermined speed rate is approximately $2\frac{1}{2}$ to 3 times the second predetermined speed rate.

20. An apparatus as claimed in claim 1, further including output means for receiving each of said bottles from said second transport means in said open end trailing disposition and repositioning said bottles into open-end up, base-down position for dispensation in said open-end up, base-down position.

21. An apparatus as claimed in claim 1, wherein said distinguishing means comprise cam means disposed in a predetermined position with respect to said first and second pairs of endless belts for engagement with each of said first randomly disposed bottles at said first pairs of endless belts.

22. An apparatus as claimed in claim 21, wherein said cam means engage each of said first randomly disposed bottles at said second pair of endless belts.

23. An apparatus as claimed in claim 21, wherein said cam means comprise two cam members spaced with respect to each other, one of said cam members engaging each of said first and second randomly disposed bottles at said first pair of endless belts and the other of said cam members engaging each of said first and second randomly disposed bottles at said second pair of endless belts.

24. An apparatus as claimed in claim 23, wherein one of said cams has a cam surface that curves downwardly away from said first pair of endless belts during movement of said bottles in said first direction, and the other said cam curves upwardly toward said second pair of endless belts during movement of said bottles in said first direction.

25. An apparatus as claimed in claim 24 wherein said cams are sequentially arranged such that said bottle engages said one cam prior to engagement with said other cam during movement in said first direction.

26. An apparatus as claimed in claim 23, wherein said one of said cam members engage each of said first and second randomly disposed bottles at said first and second pair of endless belts.

27. An apparatus as claimed in claim 23, wherein the other of said cam members engages each of said first and second randomly disposed bottles only when said bottles are at said second pair of endless belts.

28. An apparatus as claimed in claim 1, wherein said bottles comprise a base portion opposite said open end and said distinguishing means comprise a pivot member having a pivot axis, said pivot member being engageable with each of said bottles while said bottles are at said first transport means, said pivot member including surface contact means for engaging a leading end of the bottles while said bottles are at said first transport means, said contact means including an engaging portion that moves with and slides off the base end of the bottles in said second random disposition without affecting the orientation of the bottles in said second random disposition, said engaging portion releasably holding the open end portion of bottles moving in said first random disposition whereby said holding engagement enables said bottles, upon movement by said first transport means, to urge said pivot member to pivot about said pivot axis and elevate the open end of said first randomly disposed bottles above the level of the base end.

29. An apparatus as claimed in claim 28, wherein a rotatable member is pivoted to said engaging portion.

30. An apparatus as claimed in claim 29, wherein said rotatable member is a wheel member.

31. An apparatus for moving unfilled open bottles in a first general direction and orienting said mioving bottles from a first random open-end leading disposition with respect to said first direction, to an open-end trailing position with respect to said first direction and maintaining the orientation of unfilled moving bottles in a second random open-end trailing disposition with respect to said first direction comprising,
  (a) means for initially dispensing said bottles in sequential order at a first predetermined rate of speed, in a tipped over position, in said first random open-end trailing disposition or said second random open-end leading disposition,
  (b) first transport means for receiving and moving said initially dispensed bottles in said first and second random dispositions at a second predetermined rate of speed,
  (c) second transport means for receiving each of said bottles from said first transport means and moving each of said bottles at a third predetermined rate of speed for further dispensation thereof, and (d) means for distinguishing between said first and second random dispositions while said bottles are moving from said first transport means to said second transport means, said distinguishing means including means for maintaining the second random disposition of said bottles and converting said first random disposition of said bottles to open-end trailing position such that all bottles dispensed by said second transport means are in said open-end trailing disposition, said distinguishing means comprising cam means disposed in a predetermined position with respect to said first and second transport means for engagement with each of said first randomly disposed bottles at said first transport means, said cam means comprising two cam members spaced with respect to each other, one of said cam members engaging each of said first and second randomly disposed bottles at said first transport means and the other of said cam members engaging each of said first and second randomly disposed bottles at said second transport means, and wherein one of said cams has a cam surface that curves downwardly away from said first transport means during movement of said bottles in said first direction, and the other said cam curves upwardly toward said second transport means during movement of said bottles in said first direction.

32. An apparatus as claimed in claim 31 wherein said cams are sequentially arranged such that said bottle engages said one cam prior to engagement with said other cam during movement in said first direction.

33. An apparatus as claimed in claim 31 wherein said one of said cam members engage each of said first and second randomly disposed bottles at said first and second transport means.

34. An apparatus as claimed in claim 31 wherein the other of said cam members engage each of said first and second randomly disposed bottles only when said bottles are at said second transport means.

35. An apparatus for moving unfilled open bottles in a first general direction and orienting said moving bottles from a first random open-end leading disposition with respect to said first direction, to an open-end trailing position with respect to said first direction and maintaining the orientation of unfilled moving bottles in a second random open-end trailing disposition with respect to said first direction comprising, (a) means for initially dispensing said bottles in sequential order at a first predetermined rate of speed, in a tipped over position, in said first random open-end trailing disposition or said second random open-end leading disposition, said bottles having a maximum crosswise dimension in a plane perpendicular to said first direction, (b) transport means comprising a pair of spaced endless movable belts spaced apart a distance less than the maximum crosswise dimension of said bottle for receiving and moving said initially dispensed bottles in said first and second random dispositions at a second predetermined rate of speed for further dispensation at said second rate of speed, and (c) means for distinguishing between said first and second random dispositions while said bottles are being moved by said transport means, said distinguishing means including cam means for maintaining the second random disposition of said bottles and converting said first random disposition of said bottles to open-end trailing position such that all bottles dispensed by said transport means are in said open-end trailing disposition, said cam means comprising a pair of cam members disposed below said pair of endless movable belts and spaced from each other in said first direction, and wherein one of said cams has a cam surface that curves downwardly away from said pair of belts during movement of said bottles in said first direction, and the other said cam curves upwardly toward said pair of belts during movement of said bottles in said first direction.

36. An apparatus as claimed in claim 35 wherein said cams are sequentially arranged such that said bottle engages said one cam prior to engagement with said other cam during movement in said first direction.

37. The apparatus as claimed in claim 35 wherein said one cam is formed with a curved planar surface.

38. The apparatus as claimed in claim 35 wherein said one cam is formed with two spaced and curved elongated rod-like members.

* * * * *